(12) United States Patent
Luo et al.

(10) Patent No.: US 11,099,672 B2
(45) Date of Patent: Aug. 24, 2021

(54) TOUCH CONTROL PANEL, METHOD FOR MANUFACTURING TOUCH CONTROL PANEL AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Hongqiang Luo, Beijing (CN); Jianjun Wu, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/423,000

(22) Filed: May 25, 2019

(65) Prior Publication Data

US 2020/0012370 A1   Jan. 9, 2020

(30) Foreign Application Priority Data

Jul. 3, 2018   (CN) .......................... 201810720275.0

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/0416* (2013.01)

(58) Field of Classification Search
CPC ...... G06F 3/0412; G06F 3/0416; G06F 3/047; G06F 3/0446; G06F 3/0443; G06F 2203/04103
See application file for complete search history.

(56) References Cited

U.S. PATENT DOCUMENTS

| 9,501,181 B2 * | 11/2016 | Kang ................... G06F 3/0446 |
| 10,459,554 B2 * | 10/2019 | Funayama ........ G02F 1/133385 |
| 10,564,748 B2 * | 2/2020 | Koide ................... G06F 3/0416 |

(Continued)

FOREIGN PATENT DOCUMENTS

| CN | 104407758 A | 3/2015 |
| CN | 104503617 A | 4/2015 |
| CN | 105373246 A | 3/2016 |

OTHER PUBLICATIONS

First Office Action for CN Patent Application No. 201810720275.0 dated Dec. 30, 2020.

*Primary Examiner* — Muhammad N Edun
(74) *Attorney, Agent, or Firm* — Thomas | Horstemeyer, LLP

(57) ABSTRACT

The present disclosure provides a touch control panel, a method for manufacturing the touch control panel, and a display device. The touch control panel includes a substrate, a touch control electrode, and a plurality of conductive connection lines. The substrate includes a first side surface and a second side surface that are oppositely disposed. The touch control electrode is formed on the first side surface, which includes sensing electrodes and driving electrodes that are alternately arranged. The plurality of conductive connection lines are formed on the second side surface, which are configured to connect the driving electrodes and the sensing electrodes to a touch control chip.

17 Claims, 4 Drawing Sheets

(56) References Cited

U.S. PATENT DOCUMENTS

2014/0375907 A1* 12/2014 Wu .................. G06F 3/0412
　　　　　　　　　　　　　　　　　　　349/12
2016/0246415 A1   8/2016 Bae et al.
2017/0139252 A1*  5/2017 Chen ................ G06F 3/0416

* cited by examiner

TOUCH CONTROL PANEL, METHOD FOR MANUFACTURING TOUCH CONTROL PANEL AND DISPLAY DEVICE

CROSS REFERENCE TO RELATED APPLICATION

This application is based upon, and claims the benefit of and priority to, Chinese Patent Application No. 201810720275.0, filed on Jul. 3, 2018, the entire contents thereof being incorporated herein by reference.

TECHNICAL FIELD

The present disclosure relates to the field of touch control technology and, more particularly, to a touch control panel, a method for manufacturing the touch control panel, and a display device.

BACKGROUND

Ultra-narrow rim display technology intends to minimize an area of the rim of a display screen and increase the area of an active area (AA) of the display screen when the size of the display screen is fixed. Ultra-narrow rim display technology can make display devices more beautiful and fashionable from the visual effect. At the same time, when users enjoy pictures presented by this display technology, they can get a wider field of view and be provided with a better viewing experience.

With the continuous development of touch display technology, ultra-narrow rim touch control technology corresponding to the ultra-narrow rim display technology has become a main direction of touch screen research. A touch control panel includes a touch control region and a non-touch control region located around the touch control region. The ultra-narrow rim touch control technology is a technology for minimizing the area of the non-touch control region (rim).

It should be understood that the information disclosed in the background above is not only provided to facilitate understanding of the background of the present disclosure, and may include information which doesn't constitute the related art well-known for those ordinary skilled in the art.

SUMMARY

According to an aspect of the present disclosure, a touch control panel is provided, including: a substrate having a first side surface and a second side surface that are oppositely disposed; a touch control electrode formed on the first side surface, wherein the touch control electrode includes sensing electrodes and driving electrodes that are alternately arranged; and a plurality of conductive connection lines formed on the second side surface, which are configured to connect the driving electrodes and the sensing electrodes to a touch control chip.

In an exemplary embodiment of the present disclosure, a plurality of through holes are disposed in the substrate, and the conductive connection lines are connected to the touch control electrode through the through holes.

In an exemplary embodiment of the present disclosure, the through holes are filled with a conductive material which is connected to the conductive connection lines and the touch control electrode, respectively.

In an exemplary embodiment of the present disclosure, the through holes are located at one end of the touch control electrode.

In an exemplary embodiment of the present disclosure, the touch control panel includes a touch control region and a non-touch control region, and the conductive connection lines include: leads located in the touch control region, wherein first ends of the leads are connected to the touch control electrode; and pins located in the non-touch control region and connected to second ends of the leads, wherein the pins are configured to connect with the touch control chip.

In an exemplary embodiment of the present disclosure, the leads are selected as an indium tin oxide layer formed on the second side surface.

In an exemplary embodiment of the present disclosure, the leads are selected as a metal layer formed on the second side surface.

In an exemplary embodiment of the present disclosure, the leads are selected as a plurality of metal layers connected in parallel.

According to an aspect of the present disclosure, a method for manufacturing a touch control panel is further provided, including: providing a substrate having a first side surface and a second side surface that are oppositely disposed; forming a touch control electrode on the first side surface of the substrate; forming conductive connection lines on the second side surface of the substrate, wherein the conductive connection lines are configured to connect the touch control electrode to a touch control chip.

According to an aspect of the present disclosure, a display device is further provided, including a touch control panel and a display panel, wherein a touch control region of the touch control panel corresponds to a display region of the display panel, and the touch control panel includes: a substrate having a first side surface and a second side surface that are oppositely disposed; a touch control electrode formed on the first side surface, wherein the touch control electrode includes sensing electrodes and driving electrodes that are alternately arranged; a plurality of conductive connection lines formed on the second side surface, which are configured to connect the driving electrodes and the sensing electrodes to a touch control chip.

The present disclosure provides a touch control panel, a method for manufacturing the touch control panel, and a display device. The touch control electrode and the conductive connection lines of the touch control are formed on two side surfaces of the substrate, respectively. On one hand, the conductive connection lines can be formed on the touch control region of the touch control panel, so that the non-touch control region for forming the conductive connection lines is not needed to be disposed on two sides of the touch control region, thereby reducing the width of rims on the two sides of the touch control panel. On the other hand, the touch control panel has a simple structure and low cost of manufacture.

It should be understood that the above general description and the following detailed description are intended to be illustrative and explanatory and do not limit the disclosure.

BRIEF DESCRIPTION OF THE DRAWINGS

The drawings that are incorporated into the description and constitute a part of the present description illustrate embodiments in accordance with the present disclosure, and are used for explaining principle(s) of the present disclosure together with the description. It should be understood that the following drawings merely illustrate some embodiments of the present disclosure, from which other alternatives can be derived without any creative work for those having ordinary skilled in the art.

DETAILED DESCRIPTION

Figure 1:
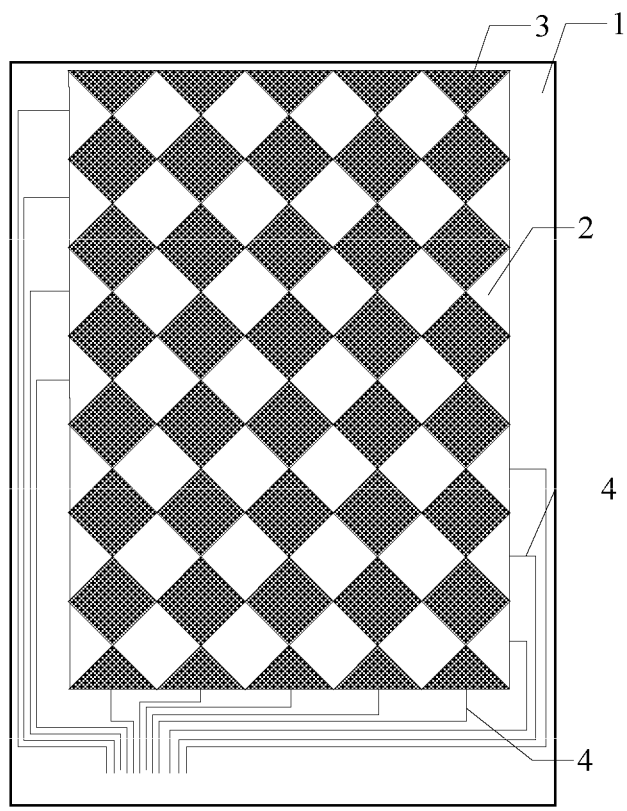
FIG. 1 is a schematic diagram illustrating a touch control panel in the related art.

Exemplary embodiments will now be described more thoroughly with reference to the accompanying drawings. However, the exemplary embodiments can be implemented in various forms and should not be constructed as being limited to the embodiments described herein. On the contrary, providing these embodiments enables the present disclosure to be comprehensive and complete, and the concept of the exemplary embodiments to be fully communicated to those skilled in the art. The same reference numbers in the drawings denote the same or similar parts, and thereby will be omitted.

Although the relative terms such as "upper" and "lower" are used in the instructions to describe the relative relationship of one component of an icon to another component, however, these terms are used in this instruction for convenience only, for example, the direction of one example is described according to the drawing. It should be understood that if the device as shown is flipped and turned upside and down, the component described "upper" will become the component "below". Other relative terms, such as "high", "low", "top", "bottom", "left", "right", etc., also have similar meanings. When a structure is "above" another structure, it may indicate that a structure is integrally formed on another structure, or that a structure is "directly" configured on another structure, or that a structure is "indirectly" configured on other structure through another structure.

The terms "a", "an", "the", etc. are used to express the presence of one or more elements/part/etc. The terms "include" and "provide" are used to express the meaning of the open inclusive, and also include additional elements/component/etc., in addition to the listed elements/component/etc.

In the related art, the touch control panel includes a substrate, a touch control electrode formed on the substrate, and conductive connection lines. The conductive connection lines are configured to connect the touch control electrode to a touch control chip which is configured to control the touch control electrode to realize a capacitive touch.

However, in the related art, a certain non-touch control region needs to be reserved for forming the conductive connection lines on two sides of the touch control region in the touch control panel, which increases the width of rims on the two sides of the touch control panel.

A purpose of the present disclosure is to provide a touch control panel, a method for manufacturing the touch control panel, and a display device. A touch control electrode and conductive connection lines of the touch control are formed on two side surfaces of a substrate respectively, thereby solving a technical problem that rims on two sides of the touch control panel are wider in the related art.

As shown in FIG. 1, which is a schematic diagram illustrating a touch control panel in the related art, the touch control panel includes a substrate 1, a control touch panel, and a plurality of conductive connection lines 4. The touch control electrode includes sensing electrodes 2 and driving electrodes 3, and each of the driving electrodes 3 or the sensing electrodes 2 is connected to a conductive connection line 4. The conductive connection lines 4 are configured to connect the touch control electrode to a touch control chip (not shown in the figure). In the related art, a non-touch control region with a certain width needs to be reserved for forming the conductive connection lines 4 on two sides of the touch control panel, which increases the width of the touch control panel.

Figure 2:
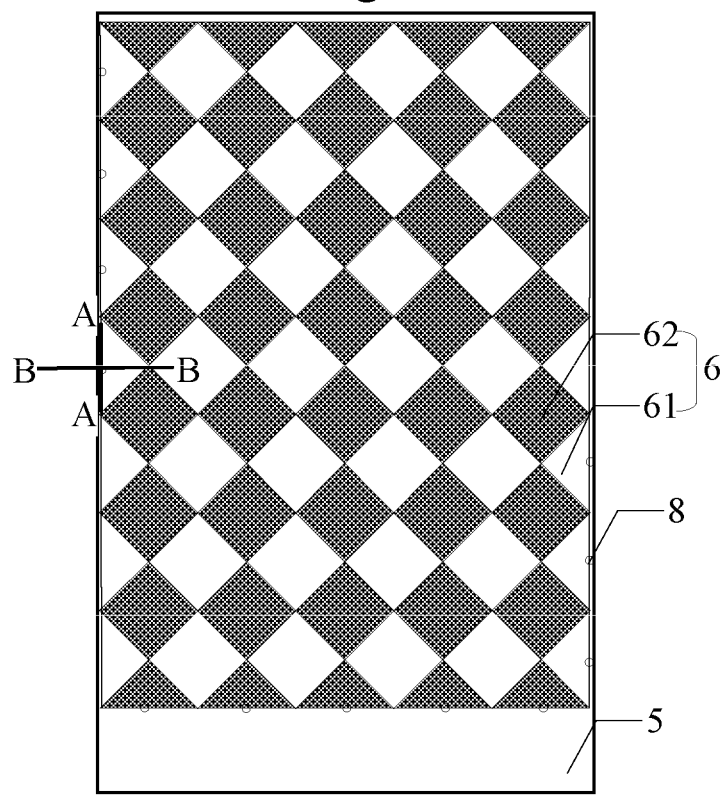
FIG. 2 is a front view of the touch control panel of the present disclosure in an exemplary embodiment.
Figure 3:
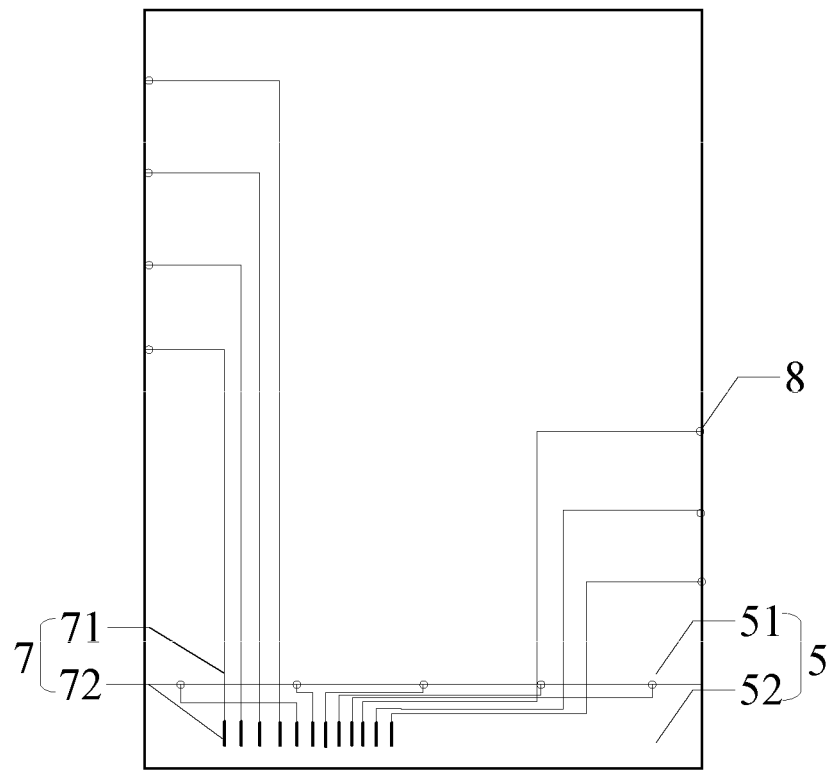
FIG. 3 is a rear view of the touch control panel of the present disclosure in an exemplary embodiment.

Based on this, the present exemplary embodiment provides a touch control panel, as shown in FIG. 2 and FIG. 3. FIG. 2 is a front view of the touch control panel of the present disclosure in an exemplary embodiment. FIG. 3 is a rear view of the touch control panel of the present disclosure in an exemplary embodiment. The touch control panel includes a substrate 5, a touch control electrode 6, and a plurality of conductive connection lines 7. The substrate 5 includes a first side surface 100 and a second side surface 200 that are oppositely disposed. The touch control electrode 6 is formed on the first side surface 100, and the touch control electrode 6 includes sensing electrodes 61 and driving electrodes 62 that are alternately arranged. The plurality of conductive connection lines 7 are formed on the second side surface 200, which are configured to connect the driving electrodes 62 and the sensing electrodes 61 to the touch control chip.

The present exemplary embodiment provides a touch control panel. The touch control electrodes and the conductive connection lines of the touch control panel are formed on two side surfaces of the substrate. On one hand, the conductive connection lines can be formed on a touch control region (a region for forming the touch control electrode) of the touch control panel, so that a non-touch control region for forming the conductive connection lines is not needed to be disposed on two sides of the touch control region, thereby reducing the width of rims on the two sides of the touch control panel. On the other hand, the touch control panel has a simple structure and low cost.

In the present exemplary embodiment, the substrate may be a flexible substrate or a non-flexible substrate. The touch control electrode may be composed of transparent indium tine oxide (ITO), of which a shape may be a diamond shape or other shapes, for example, a triangle, a rectangle, etc. The touch control electrode and the conductive connection lines may be formed on side surfaces of the substrate by a plating process or a photolithography process.

Figure 4:
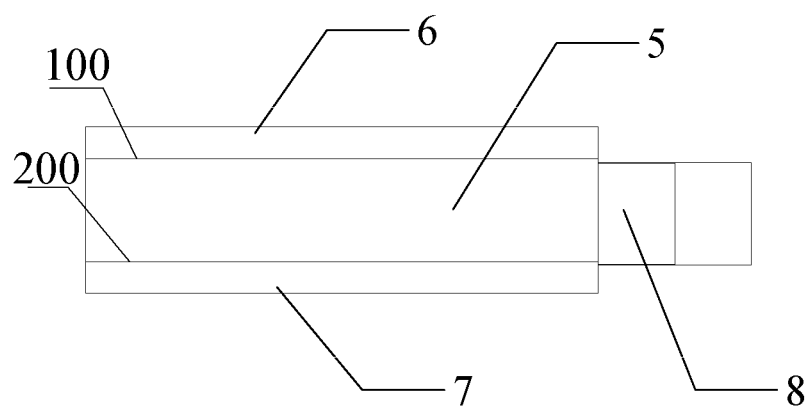
FIG. 4 is a cross-sectional view along line A-A in FIG. 2.
Figure 5:
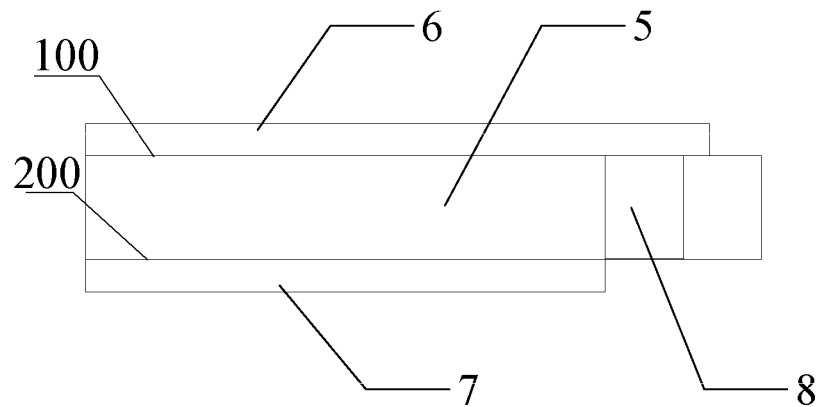
FIG. 5 is a cross-sectional view along line B-B in FIG. 2.

In the present exemplary embodiment, as shown in FIG. 2, FIG. 4, FIG. 5, FIG. 4 is a cross-sectional view along line A-A in FIG. 2, and FIG. 5 is a cross-sectional view along line B-B in FIG. 2. An implementation method of connecting the conductive connection lines 7 and the touch control electrode 6 may include a plurality of through holes 8 that may be disposed in the substrate 5, and the through holes 8 may be filled with a conductive material which is connected to the conductive connection lines 7 and the touch control electrode 6, respectively. In the embodiment, the conductive material may be selected from conductive materials such as silver, copper, etc. The through holes 8 may be located at one end of the touch control electrode, that is, the through holes 8 is located at an edge of the touch control region, so that an influence of opaque conductive materials on normal display may be avoided. It should be understood that in other exemplary embodiments, there are more implementation methods of connecting the conductive connection lines 7 and the touch control electrode 6 to be chosen from. For example, a plurality of grooves may be formed in an end surface (a surface of intersected with the first side surface 100, the second side surface 200) of the substrate. The conductive connection lines 7 may be connected to the touch control electrode through the grooves located in a side of the substrate. The conductive connection lines 7 may further be connected to the touch control electrode by directly passing through the through holes, which are all within the protection scope of the present disclosure.

In the present exemplary embodiment, as shown in FIG. 3, the touch control panel includes a touch control region 51 and a non-touch control region 52. The conductive connection lines 7 include leads 71 and pins 72. The leads 71 are located in the touch control region 51, and first ends of the leads are connected to the touch control electrode 6. The pins 72 are located in the non-touch control region 52 and connected to second ends of the leads 71, which are configured to connect with the touch control chip. In the embodiment, each of the driving electrodes or sensing electrodes is connected to a first end of one of the leads, and second ends of all of the leads are connected to the pins located in the non-touch control region. The touch control chip may be mounted on a circuit board (which may be a flexible circuit board or a printed circuit board) which is provided with pins corresponding to the pins of the conductive connection lines, so that the pins of the circuit board and the conductive connection lines are connected by using an anisotropic conductive adhesive, thereby realizing a connection between the touch control electrode and the touch control chip. When the touch control panel is mounted on the display panel, the touch control region of the touch control panel is corresponded to a display region of the display panel. The pins 72 are configured to connect with the circuit board on which the touch control chip is mounted, and the pins are formed in the non-touch control region to prevent the pins, the circuit board from blocking the display region of the display panel. In the embodiment, the leads 71 may be selected as a transparent indium tin oxide layer, thereby preventing the leads from blocking the display region of the display panel.

In the present exemplary embodiment, since conductivity of the transparent indium tin oxide layer is low, it will affect performance of the touch control panel that the leads 71 are selected as the transparent indium tin oxide layer. In the present exemplary embodiment, the leads 71 may further be selected as a metal layer such as silver, copper, aluminum, etc. However, the metal layer is opaque, thus it will affect the normal display of the display panel. In the present exemplary embodiment, the width of the metal layer can be less than 5 um. When the width of the metal layer is less than 5 um, as light is emitted from display panel passes through metal leads, obvious diffraction phenomenon will occur, so that the metal layer will not affect the normal display of the display panel.

Figure 6:
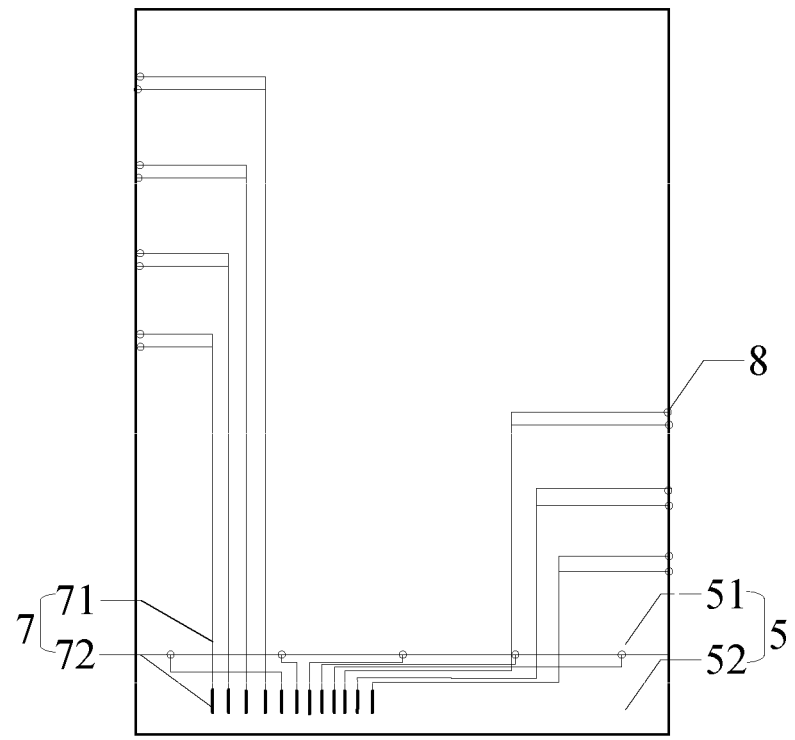
FIG. 6 is a rear view of the touch control panel of the present disclosure in another exemplary embodiment.

When the leads are selected as the metal layer, the width of the metal layer needs to be um level and below. However, the smaller the width of the metal layer is, the larger resistance of the metal leads is. When resistances of metal leads are too large, it will further affect the normal display of the display panel. In the present exemplary embodiment, as shown in FIG. 6, which is a rear view of the touch control panel of the present disclosure in another exemplary embodiment, the leads 71 may be selected as two metal layers connected in parallel. A gap exists between adjacent metal layers, through which the diffraction phenomenon of the light emitted by the display panel may occur. This arrangement not only prevents the metal layer from blocking the side of the display panel from which light is emitted, but also improves electrical conductivity of the metal leads. It should be understood that in other embodiments, the leads 71 may further be composed of other numbers of metal layers connected in parallel, all of which are within the protection scope of present disclosure.

Figure 7:
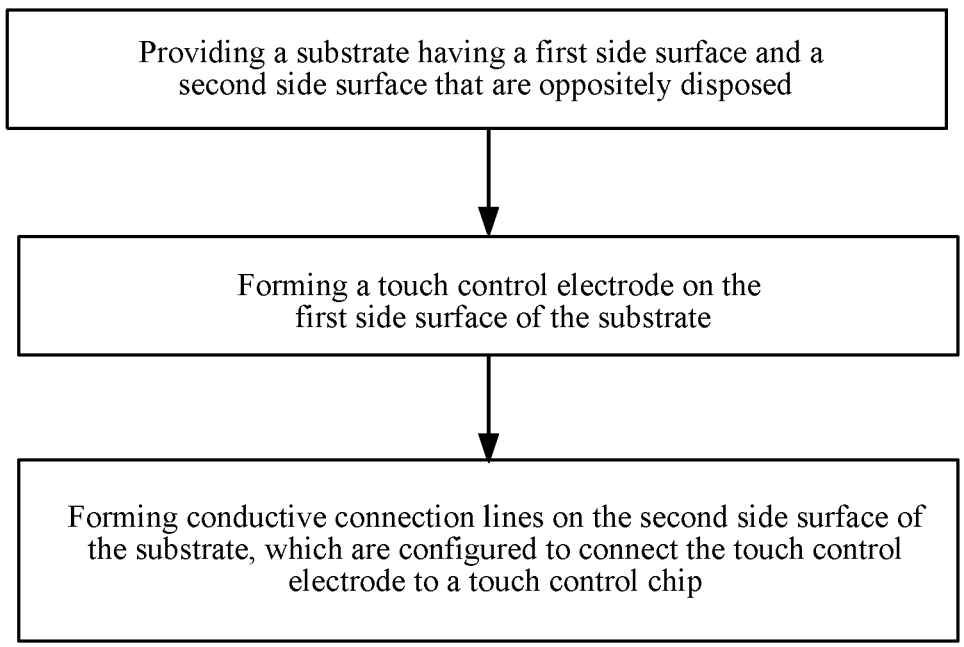
FIG. 7 is a flow chart of a method for manufacturing the touch control panel of the present disclosure.

The present exemplary embodiment further provides a method for manufacturing the touch control panel, as shown in FIG. 7, which is a flow chart of a method for manufacturing the touch control panel of the present disclosure. The method for manufacturing the touch control panel includes the following steps.

A substrate is provided which includes a first side surface and a second side surface that are oppositely disposed.

A touch control electrode is formed on the first side surface of the substrate.

The conductive connection lines are formed on the second side surface of the substrate, which are configured to connect the touch control electrode to the touch control chip.

In the embodiment, forming the touch control electrode on the first side surface of the substrate may include, first, an electrode layer (ITO) is deposited on the substrate by a coating technique and, thereafter, the electrode layer is etched into a desired shape touch electrode shape by a photolithography process. The conductive connection lines is formed on the second side of the touch control electrode. The same process as described above may be adopted to form the conductive connection lines on the second side surface of the substrate, and the details of which are not described herein again.

The method for manufacturing the touch control panel provided by the present exemplary embodiment has the same technical features and working principles as the above-mentioned touch control panel, and the above content has been described in detail, herein the details of which are not described again.

The present exemplary embodiment further provides a display device. The display device includes the touch control panel and the display panel as described above. The touch control region of the touch control panel is corresponded to the display region of the display panel.

In the present exemplary embodiment, specific types of the display device are not particularly limited, and common types of the display device in this field can be used, for example, an OLED display, etc. The display device provided by the present exemplary embodiment has the same technical features and working principles as the above-mentioned touch control panel, and the above content has been described in detail, herein the details of which are not described again.

By considering the specification and upon implementing the disclosure herein, those skilled in the art can readily conceive other embodiments of the present disclosure. The present disclosure is intended to cover all variations, purposes, or adaptive modifications of the present disclosure, which should be in accordance with the general principle of the present disclosure and should encompass common knowledge or conventional technical means not disclosed in the present disclosure. The description and the embodiments are merely deemed as illustrative, and the true scope and spirit of the present disclosure are indicated by the appended claims.

It should be understood that the present disclosure is not limited to precise structures described above and shown in the accompanying drawings, and various modifications and changes can be made without departing from their scope. The scope of the present disclosure is limited only by the appended claims.

What is claimed is:

1. A touch control panel, comprising:
    a substrate having a first side surface and a second side surface that are oppositely disposed;
    a touch control electrode formed on the first side surface of the substrate, wherein the touch control electrode comprises sensing electrodes and driving electrodes that are alternately arranged; and
    a plurality of conductive connection lines configured to connect the driving electrodes and the sensing electrodes to a touch control chip, wherein all of the plurality of conductive connection lines are formed directly on the second side surface of the substrate, wherein orthographic projections of at least some of the plurality of conductive connection lines on the substrate overlap with an orthographic projection of the touch control electrode on the substrate.

2. The touch control panel according to claim 1, wherein a plurality of through holes are disposed in the substrate, and the conductive connection lines are connected to the touch control electrode through the through holes.

3. The touch control panel according to claim 2, wherein the through holes are filled with a conductive material connected to the conductive connection lines and the touch control electrode, respectively.

4. The touch control panel according to claim 2, wherein the through holes are located at one end of the touch control electrode.

5. The touch control panel according to claim 4, wherein:
    the touch control panel comprises a touch control region and a non-touch control region; and
    the conductive connection lines comprise:
        leads located in the touch control region, wherein first ends of the leads are connected to the touch control electrode; and
        pins located in the non-touch control region and connected to second ends of the leads, wherein the pins are configured to connect with the touch control chip.

6. The touch control panel according to claim 5, wherein the leads comprise an indium tin oxide layer formed on the second side surface.

7. The touch control panel according to claim 5, wherein the leads comprise a metal layer formed on the second side surface.

8. The touch control panel according to claim 7, wherein the leads comprise a plurality of metal layers connected in parallel.

9. A method for manufacturing a touch control panel, comprising:
    providing a substrate having a first side surface and a second side surface that are oppositely disposed;
    forming a touch control electrode on the first side surface of the substrate, wherein the touch control electrode comprises sensing electrodes and driving electrodes that are alternately arranged; and
    forming a plurality of conductive connection lines configured to connect the touch control electrode to a touch control chip, wherein all of the plurality of conductive connection lines are formed directly on the second side surface of the substrate, wherein orthographic projections of at least some of the plurality of conductive connection lines on the substrate overlap with an orthographic projection of the touch control electrode on the substrate.

10. A display device, comprising:
    a touch control panel; and
    a display panel, wherein a touch control region of the touch control panel corresponds to a display region of the display panel, and the touch control panel comprises:
        a substrate having a first side surface and a second side surface that are oppositely disposed;
        a touch control electrode formed on the first side surface of the substrate, wherein the touch control electrode comprises sensing electrodes and driving electrodes that are alternately arranged; and
        a plurality of conductive connection lines configured to connect the driving electrodes and the sensing electrodes to a touch control chip, wherein all of the plurality of conductive connection lines are formed directly on the second side surface of the substrate, wherein orthographic projections of at least some of the plurality of conductive connection lines on the substrate overlap with an orthographic projection of the touch control electrode on the substrate.

11. The display device according to claim 10, wherein a plurality of through holes are disposed in the substrate, and the conductive connection lines are connected to the touch control electrode through the through holes.

12. The display device according to claim 11, wherein the through holes are filled with a conductive material connected to the conductive connection lines and the touch control electrode, respectively.

13. The display device according to claim 11, wherein the through holes are located at one end of the touch control electrode.

14. The display device according to claim 13, wherein:
    the touch control panel comprises a touch control region and a non-touch control region; and
    the conductive connection lines comprise:
        leads located in the touch control region, wherein first ends of the leads are connected to the touch control electrode; and
        pins located in the non-touch control region and connected to second ends of the leads, wherein the pins are configured to connect with the touch control chip.

15. The display device according to claim 14, wherein the leads comprise an indium tin oxide layer formed on the second side surface.

16. The display device according to claim 14, wherein the leads comprise a metal layer formed on the second side surface.

17. The display device according to claim 16, wherein the leads comprise a plurality of metal layers connected in parallel.

* * * * *